US009535781B2

(12) United States Patent
Xie et al.

(10) Patent No.: US 9,535,781 B2
(45) Date of Patent: Jan. 3, 2017

(54) SYSTEM FILE REPAIR METHOD AND APPARATUS

(71) Applicant: Tencent Technology (Shenzhen) Company Limited, Shenzhen, Guangzhong (CN)

(72) Inventors: Fei Xie, Shenzhen (CN); Jinsong Ma, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 334 days.

(21) Appl. No.: 14/156,196

(22) Filed: Jan. 15, 2014

(65) Prior Publication Data
US 2014/0136893 A1    May 15, 2014

Related U.S. Application Data

(63) Continuation of application No. PCT/CN2013/071917, filed on Feb. 27, 2013.

(30) Foreign Application Priority Data

Mar. 16, 2012   (CN) .......................... 2012 1 0069822

(51) Int. Cl.
  *G06F 11/00*   (2006.01)
  *G06F 11/07*   (2006.01)
  *G06F 11/14*   (2006.01)

(52) U.S. Cl.
  CPC ....... *G06F 11/0793* (2013.01); *G06F 11/1469* (2013.01)

(58) Field of Classification Search
CPC combination set(s) only.
See application file for complete search history.

(56) References Cited

U.S. PATENT DOCUMENTS 5,668,991 A * 9/1997 Dunn ................ G06F 17/30371
5,727,206 A * 3/1998 Fish .................... G06F 11/1435
                                                  707/999.202

(Continued)

FOREIGN PATENT DOCUMENTS

| CN | 1558600    | 12/2004 |
| CN | 1777867 A  | 5/2006  |

(Continued)

OTHER PUBLICATIONS

International Search Report from PCT/CN2013/071917 dated Jun. 6, 2013.

(Continued)

*Primary Examiner* — Amine Riad
(74) *Attorney, Agent, or Firm* — Brinks Gilson & Lione

(57) ABSTRACT

A method and an apparatus for repairing a system file are provided. The computer-implemented method for repairing a system file, comprises: detecting, by a processor, a corrupted system file in an operating system; sending identification information of the operating system and an identifier of the corrupted system file to a server; receiving an integrity identifier of an intact system file to be used in repairing the corrupted system file, wherein the intact system file is determined by the server according to the identification information of the operating system and the identifier of the corrupted system file; verifying, by the processor, the received integrity identifier with a locally stored integrity identifier of the corrupted system file; and if the received integrity identifier passes the verification, obtaining, from the server, the intact system file corresponding to the verified integrity identifier and repairing the corrupted system file with the obtained intact system file.

12 Claims, 4 Drawing Sheets

(56) References Cited

U.S. PATENT DOCUMENTS

| | | | | |
|---|---|---|---|---|
| 5,869,823 | A | * | 2/1999 | Bublitz ................. G06F 11/004 235/380 |
| 5,991,774 | A | * | 11/1999 | Tate ...................... G06F 11/006 707/697 |
| 6,668,374 | B1 | * | 12/2003 | Sten .......................... G06F 8/65 717/173 |
| 7,024,581 | B1 | * | 4/2006 | Wang ................. G06F 11/1417 713/2 |
| 7,024,583 | B2 | * | 4/2006 | Nguyen ............. G06F 11/1435 707/999.202 |
| 7,143,120 | B2 | * | 11/2006 | Oks .................... G06F 11/1402 707/679 |
| 7,523,343 | B2 | * | 4/2009 | Leis ................... G06F 11/0727 714/5.11 |
| 8,161,012 | B1 | * | 4/2012 | Gerraty .................. G06F 21/53 707/687 |
| 8,356,206 | B2 | * | 1/2013 | Koester .............. G06F 11/0727 714/15 |
| 8,612,398 | B2 | * | 12/2013 | Jarrett ....................... G06F 8/61 175/234 |
| 8,621,276 | B2 | * | 12/2013 | Havewala ........... G06F 11/0727 714/21 |
| 9,223,657 | B2 | * | 12/2015 | Zheng ................. G06F 11/1417 |
| 2003/0005037 | A1 | * | 1/2003 | Aija ..................... G06F 11/1417 709/203 |
| 2004/0098426 | A1 | * | 5/2004 | Ishii ................... G06F 11/1469 |
| 2005/0097141 | A1 | * | 5/2005 | Loafman ........... G06F 17/30067 |
| 2005/0132382 | A1 | | 6/2005 | McGuire et al. |
| 2006/0156140 | A1 | * | 7/2006 | Van Haegendoren ...... G06F 11/1417 714/741 |
| 2007/0169088 | A1 | * | 7/2007 | Lambert ............. G06F 11/0709 717/168 |
| 2008/0172392 | A1 | * | 7/2008 | Crichton ............... G06F 9/5072 |
| 2012/0063602 | A1 | * | 3/2012 | Xi ....................... G06F 11/1435 380/286 |
| 2014/0181051 | A1 | * | 6/2014 | Montulli ........... G06F 17/30129 707/679 |
| 2014/0181575 | A1 | * | 6/2014 | Kalach ................ G06F 11/1415 714/6.11 |
| 2015/0286530 | A1 | * | 10/2015 | Coronado ........... G06F 11/2069 714/6.23 |

FOREIGN PATENT DOCUMENTS

| | | |
|---|---|---|
| CN | 101158906 | 4/2008 |
| CN | 101174294 A | 5/2008 |
| EP | 1327191 A1 | 7/2003 |
| WO | WO 02/25438 A1 | 3/2002 |
| WO | 2011/042892 A1 | 4/2011 |

OTHER PUBLICATIONS

Chinese First Office Action for the counterpart Chinese patent application issued on Feb. 26, 2014, along with an English Concise Explanation of Relevance.

* cited by examiner

SYSTEM FILE REPAIR METHOD AND APPARATUS

CROSS-REFERENCES TO RELATED APPLICATIONS

This application is a continuation of PCT Application No. PCT/CN2013/071917, filed on Feb. 27, 2013 and entitled "SYSTEM FILE REPAIR METHOD AND APPARATUS", which claims the benefit of a Chinese Patent Application No. 201210069822.6, filed on Mar. 16, 2012 and entitled "SYSTEM FILE REPAIR METHOD AND APPARATUS", both of which are incorporated herein by reference in their entireties.

FIELD OF THE TECHNOLOGY

The disclosure relates to computer technology, and in particular, to a method and an apparatus for repairing a system file.

BACKGROUND

In the case that a corrupted system file in an operating system is detected, according to a version number and a patch number of the operating system, an identifier of the system file such as the name of the system file, and version information of the corrupted system file, a corresponding system file is downloaded from a file library to replace the corrupted system file, thus the system file is repaired.

SUMMARY

The disclosure provides a method and an apparatus for repairing a system file.

The technical solutions provided by the disclosure include are as follows. A computer-implemented method for repairing a system file, comprises: detecting, by a processor, a corrupted system file in an operating system; sending identification information of the operating system and an identifier of the corrupted system file to a server; receiving an integrity identifier of an intact system file to be used in repairing the corrupted system file, wherein the intact system file is determined by the server according to the identification information of the operating system and the identifier of the corrupted system file; verifying, by the processor, the received integrity identifier with a locally stored integrity identifier of the corrupted system file; and if the received integrity identifier passes the verification, obtaining, from the server, the intact system file corresponding to the verified integrity identifier and repairing the corrupted system file with the obtained intact system file.

An apparatus for repairing a system file, comprises an operating system, at least a processor operating in conjunction with a memory and a plurality of units, wherein the plurality of units comprise: a detection unit, configured to detect a corrupted system file; a sending unit, configured to send identification information of the operating system and an identifier of the corrupted system file to a server; a receiving unit, configured to receive an integrity identifier of an intact system file to be used in repairing the corrupted system file, wherein the intact system file is determined by the server according to the identification information of the operating system and the identifier of the system file; and a repairing unit, configured to verify the integrity identifier received by the receiving unit with a locally stored integrity identifier of the corrupted system file, and if the received integrity identifier passes the verification, obtain, from the server, the intact system file corresponding to the verified integrity identifier and repair the corrupted system file with the obtained intact system file.

A non-transitory machine-readable storage medium comprises a set of executable instructions, when executed by a device with at least one processor, enabling the processor to: detect a corrupted system file in an operating system; send identification information of the operating system and an identifier of the system file to a server; receive an integrity identifier of an intact system file to be used in repairing the corrupted system file, wherein the intact system file is determined by the server according to the identification information of the operating system and the identifier of the corrupted system file; verify, by the processor, the received integrity identifier with a locally stored integrity identifier of the corrupted system file; and if the received integrity identifier passes the verification, obtaining, from the server, the intact system file corresponding to the verified integrity identifier and repairing the corrupted system file with the obtained intact system file.

Accordingly, in the disclosure, in the case that the corrupted system file in the operating system is detected, the identification information of the operating system and the identifier of the system file are sent to the server, the integrity identifier of an intact system file to be used in repairing the system file is received, where the intact system file is determined by the server according to the identification information of the operating system and the identifier of the system file, then the received integrity identifier is verified by utilizing the locally stored integrity identifier of the corrupted system file, and if the received integrity identifier passes the verification, the system file corresponding to the verified integrity identifier is obtained from the server and the corrupted system file is repaired with the obtained intact system file. Compared with the prior art, in the technical solution of the disclosure, intact system file for repairing the corrupted system file is obtained precisely based on the integrity identifier of the system file and thereby the corrupted system file is repaired, rather than relying on a patch number of the operating system, a version number of the corrupted system file, etc., and there is no need to establish any correspondence between the patch number and the system file.

DETAILED DESCRIPTION

For brief and intuitive illustration, the solutions of the disclosure are explained hereinafter by describing a number of representative embodiments. Abundant details in the embodiments are only set forth to assist in understanding the solutions of the disclosure and obviously the technical solutions of the disclosure may not be limited to those details in practice. In order not to make the solutions of the disclosure ambiguous, some embodiments are not described in detail and only the frames of the some embodiments are given. Hereinafter, terms of "include" and "according to . . . " are intended to be non-exclusive. Due to Chinese language habits, if the number of an element is not specified clearly hereinafter, it is understood that the number of the element may be one or more.

Figure 1:
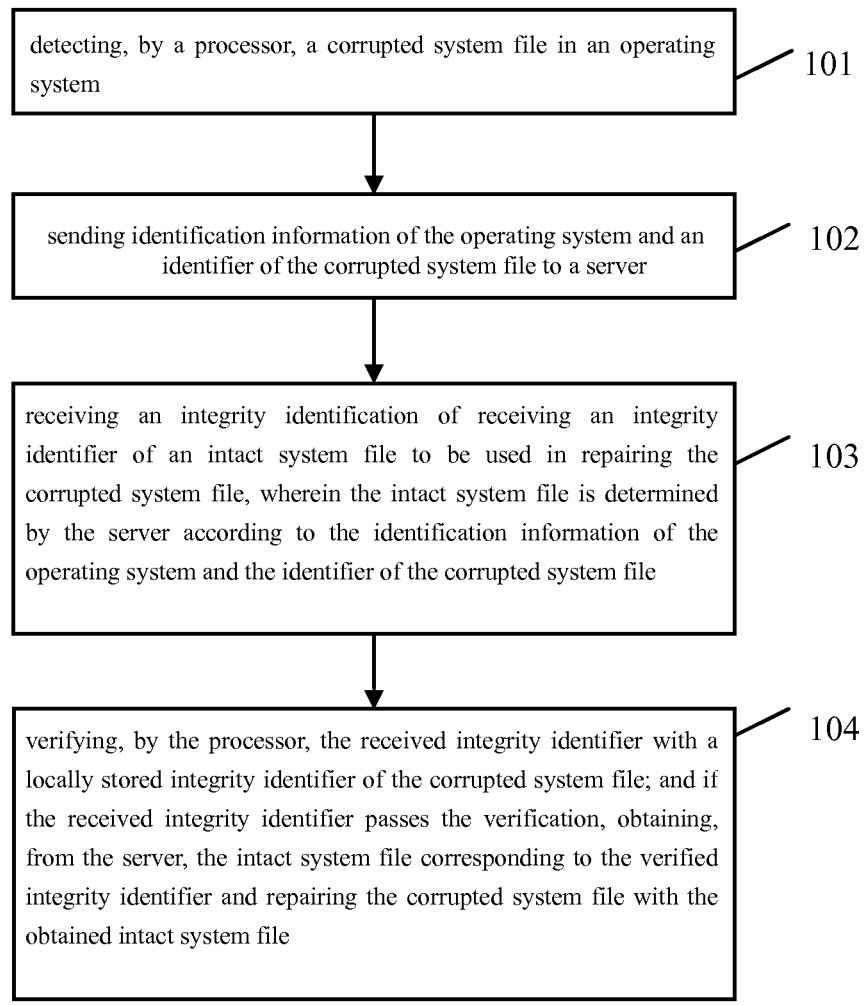
FIG. 1 is a flow chart of a method for repairing a system file according to an embodiment of the disclosure.

FIG. 1 is a flow chart of a method for repairing a system file according to an embodiment of the disclosure. As shown in FIG. 1, the method may include the following steps:

step 101, detecting by a processor, a corrupted system file in an operating system;

step 102, sending identification information of the operating system and an identifier of the system file to a server;

step 103, receiving an integrity identifier of an intact system file to be used in repairing the system file, where the intact system file is determined by the server according to the identification information of the operating system and the identification of the system file; and step 104, verifying the received integrity identifier by utilizing a locally stored integrity identifier of the corrupted system file, and if the received integrity identifier passes the verification, obtaining the system file corresponding to the verified integrity identifier and repairing the corrupted system file with the obtained system file.

Step 101 may further include: scanning the system file in the operating system and calculating the integrity identifier of the scanned system file, and determining that the system file is corrupted if the calculated integrity identifier is inconsistent with the locally stored integrity identifier of the system file. Preferably, in the disclosure, if the calculated integrity identifier is consistent with the locally stored integrity identifier of the system file, it may be determined that the scanned system file is complete, i.e., it is not corrupted.

In addition, the identification information of the operating system sent in step 102 at least includes: a type of the operating system (such as Windows XP, vista) and language pack information (such as Chinese, English) of the operating system.

In this way, in step 103, the server (also called server-side, which may include a plurality of servers, and hereinafter is abbreviated as server) retrieves, from a file library, another system file, i.e. an intact system file, applicable to the type and language pack of the operation system and having the same identifier as the corrupted system file, based on the identification information of the operating system and the identifier of the system file. The retrieved system file is determined to be used in repairing the corrupted system file. Preferably, the identifier of the system file may be the name of the system file. A server, as used herein, may refer to one or more server computers configured to provide certain server functionalities, such as database management and search engines. A server may also include one or more processors to execute computer programs in parallel.

So far the flow shown in FIG. 1 is completed.

In an example embodiment of the disclosure, each of steps 101 to 104 may be executed by a client of the operating system. In addition, in the disclosure, a mechanism is provided to verify the correctness of the system file in the operating system, where the mechanism is mainly based on catalog signatures and is as follows: calculating the integrity identifier of each system file, where the integrity identifier of each system file may preferably comprise a Hash signature (abbreviated as a Hash value) obtained by performing a Hash calculation on each system file, and in the following the illustration is made in the situation that the integrity identifier is the Hash value for convenience although other principles are similarly applicable; then recording the Hash value of each system file in a local Catalog file, and executing the flow of system file verification and repairing as shown in FIG. 2 based on Hash values of all system files recorded in the local Catalog file.

Figure 2:
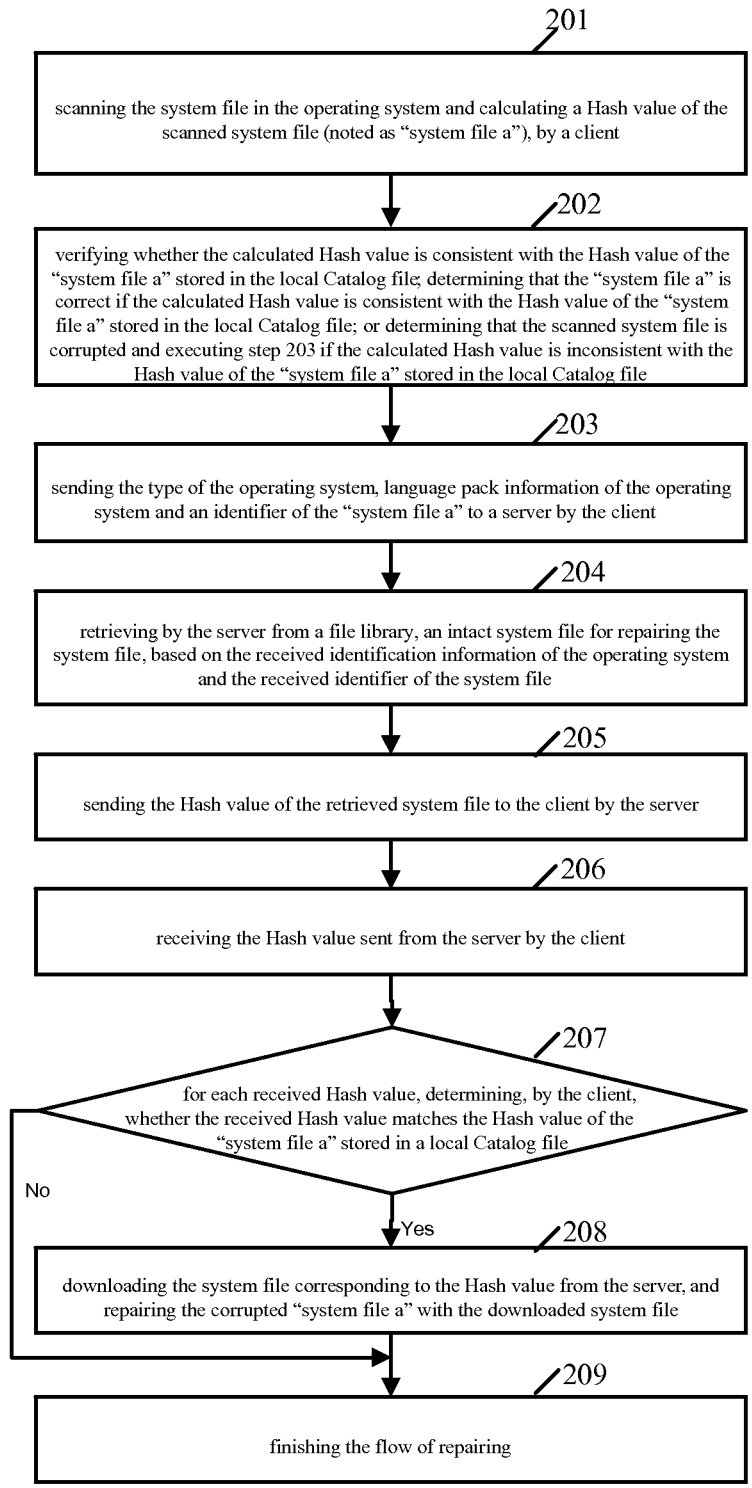
FIG. 2 is a flow chart of a method for repairing a system file according to an embodiment of the disclosure.

Referring to FIG. 2, FIG. 2 is a flow chart of a method for repairing a system file according to an embodiment of the disclosure. As shown in FIG. 2, the flow includes the following steps.

Step 201, scanning the system file in the operating system and calculating a Hash value of the scanned system file (noted as "system file a"), by a client.

In step 201, the client may scan the system file in the operating system when receiving external trigger or at a set time point.

Step 202, verifying whether the calculated Hash value is consistent with the Hash value of the "system file a" stored in the local Catalog file; determining that the "system file a" is correct if the calculated Hash value is consistent with the Hash value of the "system file a" stored in the local Catalog file; or determining that the scanned system file is corrupted and executing step 203 if the calculated Hash value is inconsistent with the Hash value of the "system file a" stored in the local Catalog file.

Step 201 to step 202 are operations of detecting whether the system file in the operating system is corrupted.

Step 203, sending the type of the operating system, language pack information of the operating system and an identification of the "system file a" to a server by the client.

Step 204, retrieving, by the server from a file library, another system file, i.e. an intact system file, for repairing the system file, based on the received identification information of the operating system and the received identifier of the system file.

Preferably, taking the situation that the identifier of the system file is the name of the system file as an example, the step 204 further includes: retrieving, by the server, the system file from the file library by taking the received identification information of the operating system and the received identifier of the system file keywords. The retrieved system file is applicable to the type and language pack of the operating system and has the same name as the corrupted system file.

Step 205, sending the Hash value of the retrieved system file to the client by the server.

In the disclosure, different system files have different Hash values, and one system file has different Hash values corresponding to respective updates of the system file at different time points. Thus, if the system file retrieved by the server has never been updated, the system file has only one Hash value; if the retrieved system file has been updated, the system file has not only one Hash value before updating but also another Hash value after updating, hence, a situation that one system file has a plurality of Hash values occurs.

Step 206, receiving the Hash value sent from the server by the client.

Steps 204 to 206 are operations for the client of receiving an integrity identifier, e.g., the Hash value, of an intact system file to be used in repairing the "system file a", where the another system file is determined by the server according to the identification information of the operating system and the identification of the "system file a".

Step 207, for each received Hash value, judging, by the client, whether the received Hash value matches the Hash value of the "system file a" stored in a local Catalog file; if the received Hash value matches the Hash value of the "system file a" stored in a local Catalog file, executing step 208; if none of the received Hash values matches the Hash value of the "system file a" stored in the local Catalog file, executing step 209.

The judgment in step 207 is an operation of verifying the received integrity identifier, e.g., the Hash value, by utilizing the locally stored integrity identifier, e.g., the Hash value, of the corrupted "system file a"; if it is judged that the received Hash value matches (e.g., is consistent with, or is highly correlated with) the Hash value of the "system file a" stored in the local Catalog file, it is indicated that the received Hash value passes the verification and in the server there exists the system file precisely matching with the "system file a"; vice versa.

Step 208, downloading the system file corresponding to the Hash value from the server, and repairing the corrupted "system file a" with the downloaded system file. Then step 209 is executed.

The process of repairing the corrupted "system file a" with the downloaded system file may include: replacing the corrupted "system file a" with the downloaded system file.

Step 209, finishing the flow of repairing.

So far the flow shown in FIG. 2 is completed.

The method provided by the disclosure is described above and the apparatus provided by the disclosure is described in the following.

Figure 3:
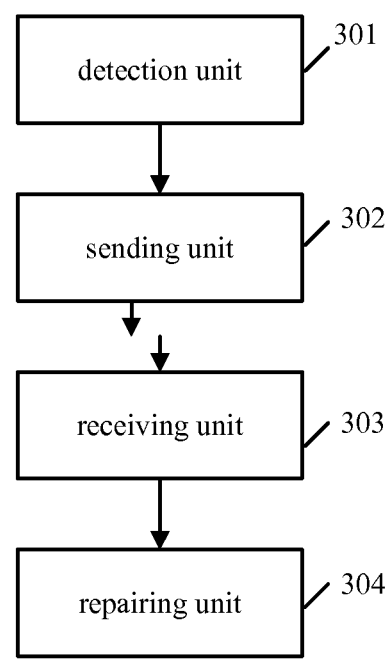
FIG. 3 is a schematic structure diagram of an apparatus for repairing a system file according to an embodiment of the disclosure.

FIG. 3 is a schematic structure diagram of an apparatus according to an embodiment of the disclosure. As shown in FIG. 3, the apparatus includes:

a detection unit 301, configured to detect that the system file in an operating system is corrupted;

a sending unit 302, configured to send identification information of the operating system and an identifier of the system file to a server;

a receiving unit 303, configured to receive an integrity identifier of another system file to be used in repairing the system file, where the another system file is determined by the server according to the identification information of the operating system and the identifier of the system file; and a repairing unit 304, configured to verify the integrity identifier received by the receiving unit 303 by utilizing a locally stored integrity identifier of the corrupted system file, and if the received integrity identifier passes the verification, obtain, from the server, the system file corresponding to the verified integrity identifier and repair the corrupted system file with the obtained system file.

The structure of the apparatus shown in FIG. 3 is described in detail in the following.

Figure 4:
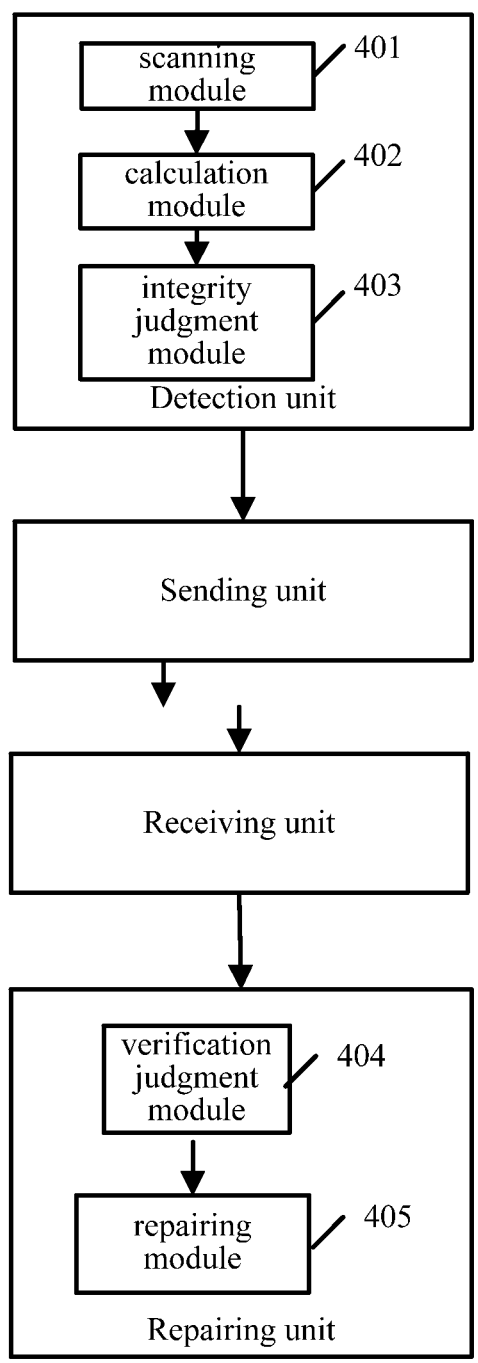
FIG. 4 is a schematic structure diagram of an apparatus for repairing a system file according to an embodiment of the disclosure.

FIG. 4 is a schematic structure diagram of an apparatus according to an embodiment of the disclosure. As shown in FIG. 4, the apparatus includes the units shown in FIG. 3.

Preferably, as shown in FIG. 4, the detection unit may include:

a scanning module 401, configured to scan the system file in the operating system;

a calculation module 402, configured to calculate an integrity identifier of the system file scanned by the scanning module 401; and an integrity judgment module 403, configured to determine whether the integrity identifier calculated by the calculation module 402 is consistent with a locally stored integrity identifier of the system file, and determine that the system file is corrupted if the integrity identifier calculated by the calculation module 402 is inconsistent with the locally stored integrity identifier of the system file.

That is to say, the detection unit may determine whether the system file is corrupted with the scanning module 401, the calculation module 402 and the integrity judgment module 403.

Furthermore, in the disclosure, the identification information of the operating system at least includes: the type of the operating system and language pack information of the operating system; accordingly, the intact system file to be used in repairing the system file, determined by the server and received by the receiving unit, may include: the system file, applicable to the type and language pack of the operating system and having the same identification as the corrupted system file.

In one example embodiment, as shown in FIG. 4, the repairing unit may include:

a verification judgment module 404, configured to, for each integrity identifier received by the receiving unit, judge whether the received integrity identifier matches the locally stored integrity identifier of the corrupted system file; determine that the received integrity identifier passes the verification if the received integrity identifier matches the locally stored integrity identifier of the corrupted system file; or determine that the received integrity identifier does not pass the verification if the received integrity identifier does not match the locally stored integrity identifier of the corrupted system file; and a repairing module 405, configured to, if the verification judgment model 404 determines that the received integrity identifier passes the verification, obtain, from the server, the system file corresponding to the verified integrity identifier and repair the corrupted system file with the obtained intact system file.

In one example embodiment of the disclosure, the integrity identifier of the system file comprises a Hash value obtained by performing a Hash operation on the system file, different system files have different Hash values, and one system file has different Hash values corresponding to respective updates of the system file at different time points.

So far the structure of the apparatus according to the embodiment of the disclosure is described in detail.

Accordingly, in the disclosure, in the case that the corrupted system file in the operating system is detected, the identification information of the operating system and the identification of the system file are sent to the server, the integrity identifier of the intact system file to be used in repairing the system file is received, where the another system file is determined by the server according to the identification information of the operating system and the identifier of the system file, then the received integrity identifier is verified by utilizing the locally stored integrity identifier of the corrupted system file, and if the received integrity identifier passes the verification, the system file corresponding to the verified integrity identifier is obtained from the server and the corrupted system file is repaired with the obtained intact system file. Compared with the prior art, in this technical solution, the system file is repaired by precisely obtaining the intact system file configured to repair the corrupted system file based on the integrity identifier of the system file, rather than relying on a patch number of the operating system, a version number of the corrupted system file, etc., or establishing any correspondence between the patch number and the system file.

In one example embodiment, with a digital signature mechanism in the disclosure, it may be ensured that a file for repairing the corrupted system file is precisely obtained and the obtained system file is consistent with the corrupted system file, thus the accuracy of the system file repairing is increased.

Furthermore, in the disclosure, the establishment of the file library is simple since there is no special requirement for the file library; no complicate data model is necessary; and the complexity the file library does not change as the number of the system files increases.

It should be noted that, not all the steps and modules in the flow charts and structure diagrams are necessary and some steps or modules may be omitted in practice. The order of executing the steps is not fixed and may be adjusted in practice. The division of the respective modules is for the convenience in illustrating different functions; in practice, one module may be implemented with multiple modules, and the functions of a plurality of modules may also be implemented with one module. Those modules may be located either in one device or distributed in different devices. Furthermore, terms of "first", "second" in the above description are merely utilized to distinguish two objects having a same definition, rather than to indicate that the two objects have a substantial difference.

Hardware modules according to different embodiments may be implemented with a mechanical approach or an electronic approach. For example, one hardware module may include a dedicatedly designed permanent circuit or logic device (such as a dedicated processor, e.g., an FPGA or an ASIC), which is configured to perform a specific operation. Alternatively, the hardware module may include a programmable logic device or circuit (e.g., a general purpose processor or any other programmable processor) temporarily configured by software, which is configured to perform a specific operation. It may be determined based on the cost and time whether the hardware modules are implemented with the mechanical approach, by applying the dedicatedly designed permanent circuit, or by applying the temporarily configured circuit (for example, configured by software).

The disclosure further provides a machine-readable storage medium, which is configured to store instructions for enabling a machine to execute the method of the disclosure. A system or a device containing the storage medium may be provided, where software program codes for implementing the function of any one of the embodiments are stored in the storage medium, and a computer (or a CPU, a MPU) may read and execute the program codes stored in the storage medium. In addition, part or all of practical operations may be performed by an operating system on the computer under the instruction of the program codes; alternatively, the program codes read from the storage medium may be written into a storage, which is disposed in an expansion board installed in the computer or an expansion unit connected with the computer, then part or all of actual operations may are executed by the CPU installed on the expansion board or in the expansion unit based on the instructions of the program codes, hence, the function of any of the embodiments is implemented.

The storage medium for providing the program codes includes a floppy disk, a hard disk, a magneto-optical disk, an optical disk (such as CD-ROM, CD-R, CD-RW, DVD-ROM, DVD-RAM, DVD-RW, DVD+RW), a magnetic tape, a nonvolatile memory card and a ROM. Optionally, the program codes may be downloaded from a server computer via a communication network.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The invention claimed is:

1. A computer-implemented method for repairing a system file, comprising:
   detecting, by a processor, a corrupted system file in an operating system;
   sending, by the processor, identification information of the operating system and an identifier of the corrupted system file to a server with system files of the operating system, wherein the identification information of the operating system comprises language pack information of the operating system, and the identifier of the corrupted system file comprises a name of the corrupted system file;
   receiving, by the processor, an integrity identifier of an intact system file to be used in repairing the corrupted system file, wherein the integrity identifier of the intact system file has a Hash value obtained by performing a Hash operation on the intact system file, and the intact system file is determined by the server according to the identification information of the operating system and the identifier of the corrupted system file;
   verifying, by the processor, the received integrity identifier with a locally stored integrity identifier of the corrupted system file; and
   if the received integrity identifier passes the verification, obtaining, from the server, the intact system file corresponding to the verified integrity identifier and repairing the corrupted system file with the obtained intact system file.

2. The method according to claim 1, wherein detecting the corrupted system file in the operating system comprises:
   scanning a system file in the operating system; calculating the integrity identifier of the scanned system file; and determining that the system file is corrupted if the calculated integrity identifier is inconsistent with the locally stored integrity identifier of the system file.

3. The method according to claim 1, wherein
   the identification information of the operating system comprises a type of the operating system; and
   the intact system file, determined by the server, has the same identifier as the corrupted system file and is compatible with the type and the language of the operating system.

4. The method according to claim 1, wherein verifying the received integrity identifier with the locally stored integrity identifier of the corrupted system file comprises:
   for each received integrity identifier, determining whether the received integrity identifier matches the locally stored integrity identifier of the corrupted system file; determining that the received integrity identifier passes the verification if the received integrity identification matches the locally stored integrity identifier; or determining that the received integrity identifier does not pass the verification if the received integrity identifier does not match the locally stored integrity identifier.

5. An apparatus for repairing a system file, comprising an operating system, at least a processor operating in conjunction with a memory and a plurality of units, the plurality of units comprise:

a detection unit, configured to detect a corrupted system file;

a sending unit, configured to send identification information of the operating system and an identifier of the corrupted system file to a server with system files of the operating system, wherein the identification information of the operating system comprises language pack information of the operating system, and the identifier of the corrupted system file comprises a name of the corrupted system file;

a receiving unit, configured to receive an integrity identifier of an intact system file to be used in repairing the corrupted system file, wherein the integrity identifier of the intact system file has a Hash value obtained by performing a Hash operation on the intact system file, and the intact system file is determined by the server according to the identification information of the operating system and the identifier of the system file; and a repairing unit, configured to verify the integrity identifier received by the receiving unit with a locally stored integrity identifier of the corrupted system file, and if the received integrity identification passes the verification, obtain, from the server, the intact system file corresponding to the verified integrity identifier and repair the corrupted system file with the obtained intact system file.

6. The apparatus according to claim 5, wherein the detection unit comprises:

a scanning module, configured to scan a system file in the operating system;

a calculation module, configured to calculate the integrity identifier of the system file scanned by the scanning module; and an integrity judgment module, configured to determine whether the integrity identifier calculated by the calculation module is consistent with the locally stored integrity identifier of the system file, and determine that the system file is corrupted if the integrity identifier calculated by the calculation module is inconsistent with the locally stored integrity identifier of the system file.

7. The apparatus according to claim 5, wherein the identification information of the operating system comprises: a type of the operating system; and the intact system file has the same identifier as the corrupted system file and is compatible with the type and the language of the operating system.

8. The apparatus according to claim 5, wherein the repairing unit comprises:

a verification judgment module, configured to, for each integrity identification received by the receiving unit, determine whether the received integrity identifier matches the locally stored integrity identifier of the corrupted system file; determine that the received integrity identifier passes the verification if the received integrity identifier matches the locally stored integrity identifier; or determine that the received integrity identifier does not pass the verification if the received integrity identification does not match the locally stored integrity identifier; and a repairing module, configured to, if the verification judgment module determines that the received integrity identifier passes the verification, obtain, from the server, the intact system file corresponding to the verified integrity identifier and repair the corrupted system file with the obtained intact system file.

9. A non-transitory machine-readable storage medium comprising a set of executable instructions, when executed by a device with at least one processor, enabling the processor to:

detect a corrupted system file in an operating system;

send identification information of the operating system and an identifier of the system file to a server with system files of the operating system, wherein the identification information of the operating system comprises language pack information of the operating system, and the identifier of the corrupted system file comprises a name of the corrupted system file;

receive an integrity identifier of an intact system file to be used in repairing the corrupted system file, wherein the integrity identifier of the intact system file has a Hash value obtained by performing a Hash operation on the intact system file, and the intact system file is determined by the server according to the identification information of the operating system and the identifier of the corrupted system file;

verify, by the processor, the received integrity identifier with a locally stored integrity identifier of the corrupted system file; and if the received integrity identifier passes the verification, obtaining, from the server, the intact system file corresponding to the verified integrity identifier and repairing the corrupted system file with the obtained intact system file.

10. The non-transitory machine-readable storage medium according to claim 9, wherein the executable instructions, when executed by a device with at least one processor, further enable the processor to scan a system file in the operating system; calculating the integrity identifier of the scanned system file; and determining that the system file is corrupted if the calculated integrity identifier is inconsistent with the locally stored integrity identifier of the system file.

11. The non-transitory machine-readable storage medium according to claim 9, wherein the identification information of the operating system comprises a type of the operating system; and the intact system file, determined by the server, has the same identifier as the corrupted system file and is compatible with the type and the language of the operating system.

12. The non-transitory machine-readable storage medium according to claim 9, wherein verifying the received integrity identifier with a locally stored integrity identifier of the corrupted system file comprises:

for each received integrity identifier, determining whether the received integrity identifier matches the locally stored integrity identifier of the corrupted system file; determining that the received integrity identifier passes the verification if the received integrity identifier matches the locally stored integrity identifier; or determining that the received integrity identifier does not pass the verification if the received integrity identifier does not match the locally stored integrity identifier.

* * * * *